March 22, 1966  R. L. SUTTON  3,241,299
CORN HEAD
Filed March 26, 1964  2 Sheets-Sheet 1

Inventor
Ralph L. Sutton
Atty.

March 22, 1966     R. L. SUTTON     3,241,299
CORN HEAD
Filed March 26, 1964     2 Sheets-Sheet 2
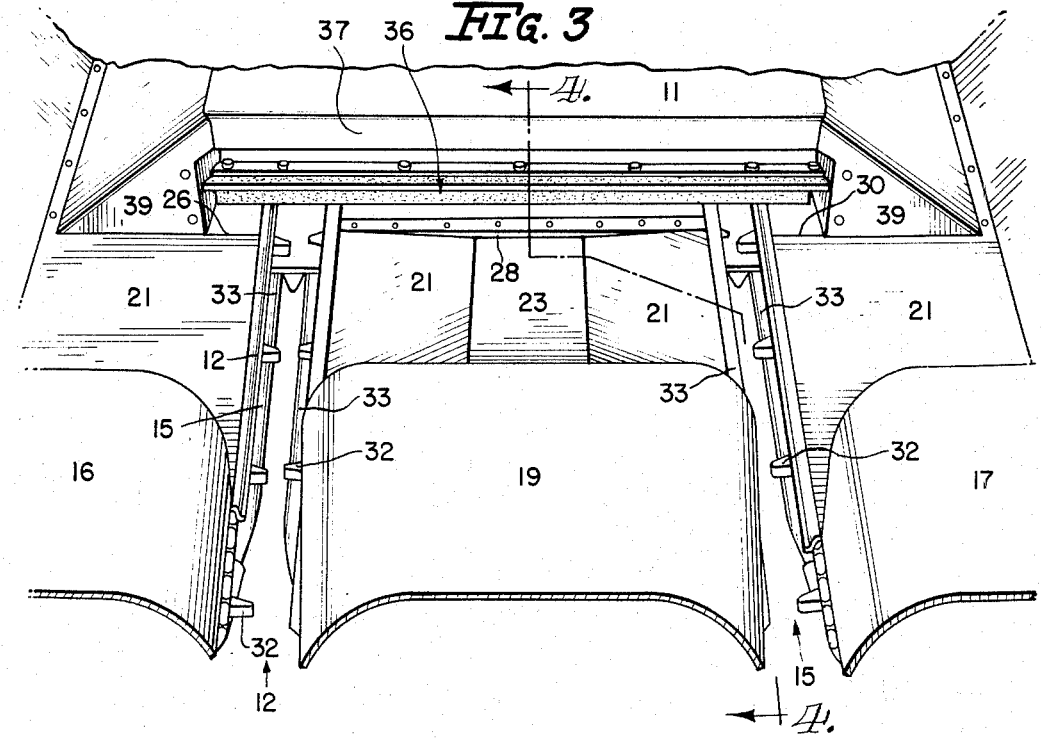
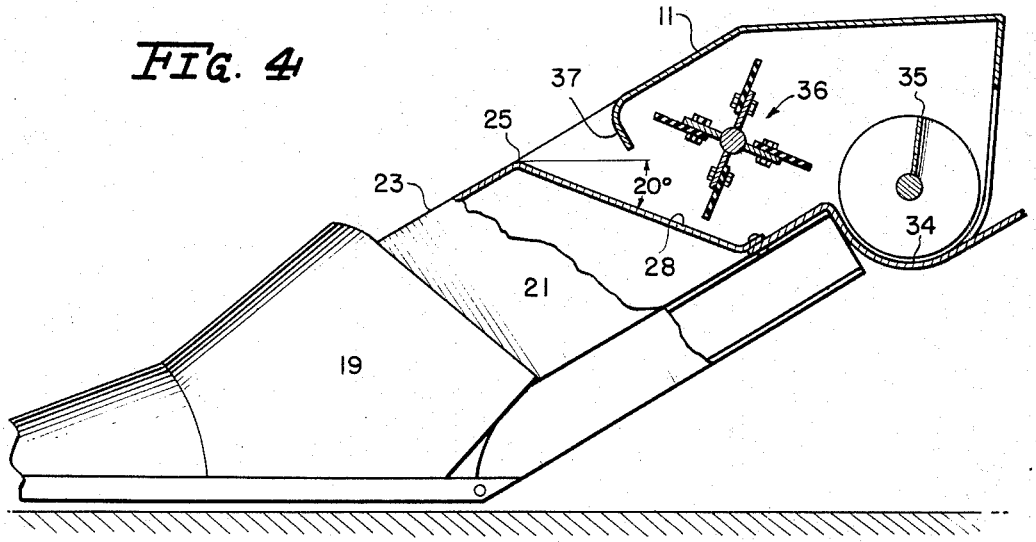
Inventor
Ralph L. Sutton
Atty.

United States Patent Office 3,241,299
Patented Mar. 22, 1966

3,241,299
CORN HEAD
Ralph L. Sutton, Rock Island, Ill., assignor to International Harvester Company, Chicago, Ill., a corporation of New Jersey
Filed Mar. 26, 1964, Ser. No. 354,863
5 Claims. (Cl. 56—18)

This invention relates to new and improved corn harvesting machines and more particularly to a new and improved corn head for a combine.

When harvesting corn with the present machinery (of the type disclosed, for example, in the patent to Karlsson No. 3,101,579 of August 27, 1963) some broken stalks, weeds and vines will inevitably be fed into the machine along with the corn. Numerous improvements have been made to reduce the amount of trash fed into the machine but it has not been completely eliminated. The inclusion of trash is undesirable for two main reasons. First, the capacity and efficiency of the processing units are adversely affected by the inclusion of trash. Secondly, the build-up of trash interferes with the normal flow of crops and some times completely chokes the flow. One particular problem that has been encountered, under certain conditions, is that when the space between the different units is closed (as shown in the above referred-to Karlsson et al. patent), broken stalks and trash tend to hang up on the ridge between the units. The accumulation of trash eventually reaches the point of imbalance and tumbles either to one side or the other greatly overloading the unit into which it falls. Another problem that has been encountered is entanglement of vines and weeds around the ends of beaters used to positively feed the crop into the transverse auger trough. This build-up of vines and weeds under some conditions has caused considerable interference with the normal flow of crops.

The general purpose of this invention is to provide a corn harvesting machine which embraces all the advantages of similar machines and possesses none of the afore-described disadvantages. To attain this, the present invention contemplates a uniquely shaped brake in the gatherer sheet between each unit of the corn head that cooperates with an extended beater to feed the material, including trash that has been unavoidably picked up, into the trough containing the transverse auger. The broken stalk and other trash can slide down the gentle slope of the gatherer sheet between the units where it encounters the extended beater. The extended beater then through positive engagement moves the material into the trough containing the transverse auger. Also, uniquely shaped corner filler pieces are provided to prevent the entanglement of weeds and vines around the ends of the extended beater. Since in this invention the beater has been extended across the complete width of the corn head there are only two points at which the entanglement problem is found. These corner filler pieces engage the material as it is being fed rearwardly before the extended beater is encountered and changes the direction of the material at each end such that it is moving inwardly and rearwardly when it is initially engaged by the extended beater. Since entanglement occurs around the end of the beater, this slight inward change of direction is sufficient to overcome the problem.

An object of this invention is the provision of a corn head that will prevent entanglement of trash and choking-off of the material feed.

Another object of this invention is the provision of gatherer sheets between the units of corn heads that break downwardly to permit broken stalks that collect on the ridge of the gatherer sheet to slide downwardly and be positively engaged by the extended beater on their path to the transverse auger.

Still another object of this invention is to provide means to prevent entanglement of weeds and vines around the ends of the extended beater by changing the direction of material flow inwardly at the beater ends.

Yet, another object of this invention is the provision of an extended beater that positively engages the material to insure that it will be fed into the trough containing the transverse auger.

These and other objects of the invention will become more apparent from the specification and drawings, wherein:

FIGURE 3 is a view of a two-row corn head taken along lines 3—3 of FIGURE 2 having sections broken away; and FIGURE 4 is a side view of the two-row corn head partially in section taken along lines 4—4 of FIGURE 3.

Figure 1:
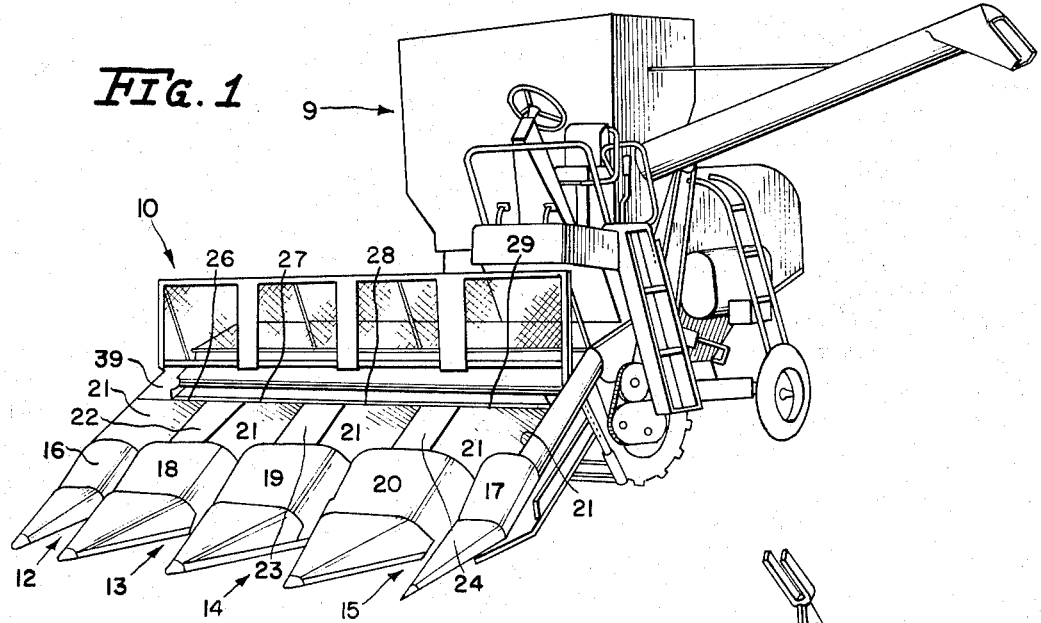
FIGURE 1 is a perspective view of a four-row corn head mounted on a conventional combine.

Referring now to the drawings wherein like reference characters designate like or corresponding parts throughout the several views, there is shown in FIGURE 1 a conventional combine designated 9 having a four-row corn head 10 mounted thereon. The four-row corn head includes a transverse frame 11 having picking units 12, 13, 14 and 15 secured thereto. Since the invention is directed to the material-handling function of the corn head, the moving elements of the picking unit have not been illustrated in detail. Outer divider elements 16 and 17 are secured to the transverse frame 11 at its end portions. Intermediately disposed center dividers 18, 19 and 20 are also supported by the transverse frame 11.

The outer divider elements 16 and 17 include gathering sheets 21 that function to guide the material rearwardly and inwardly. The gathering sheets 21 of center dividers 18, 19 and 20 form ridges designated 22, 23 and 24 respectively along the longitudinal center of the center dividers and function to guide the material on either side of the ridge rearwardly and outwardly. Thus, the gathering sheets around each picking unit 12, 13, 14 and 15 tend to feed the material towards the center of the unit and towards the rear of the harvesting machine. The ridges 22, 23 and 24, as disclosed herein, are illustrated as flat sheets, however, the ridges could be rounded or peaked. The gathering sheets break downwardly at 25 forming sloped portions designated 26, 27, 28, 29 and 30.

Figure 2:
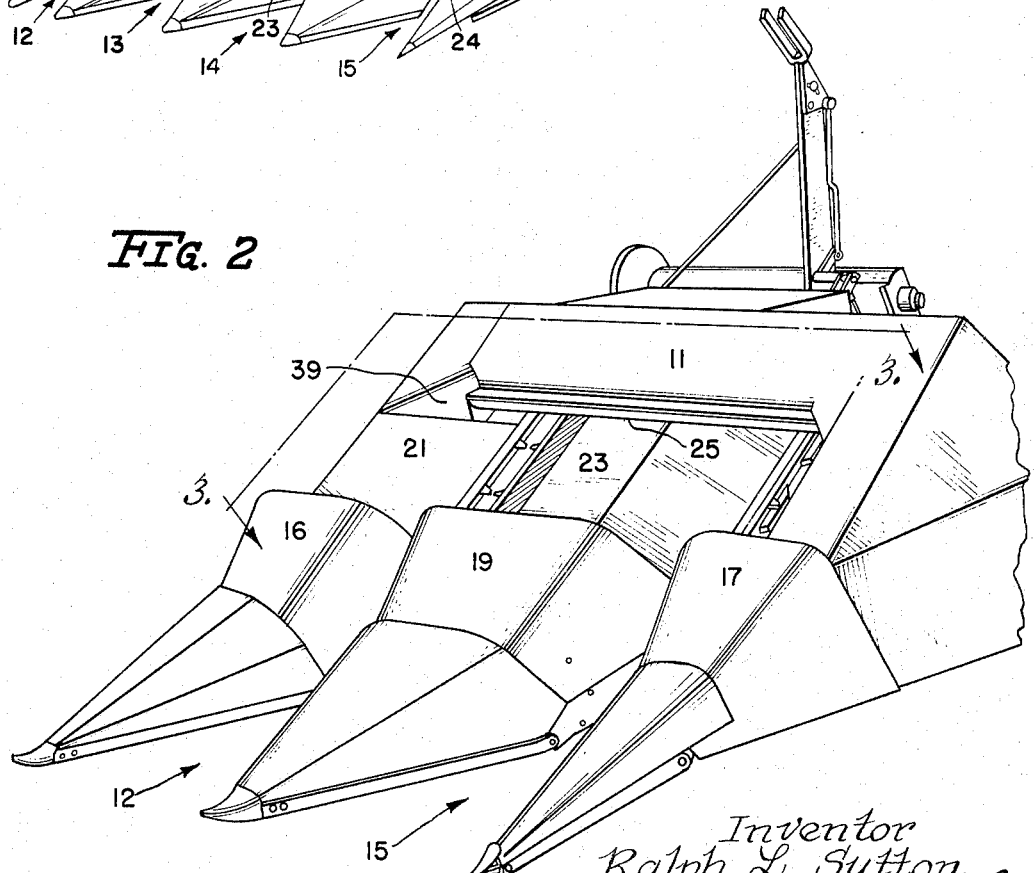
FIGURE 2 is a perspective view of a two-row corn head.

This invention can be utilized in a two-row, four-row, or any multiple-row corn harvesting machine. Since, insofar as this invention is concerned, corn harvesting machines of more than two rows involve a mere duplication of elements, a two-row corn machine has been shown in FIGURES 2 through 4 to illustrate the invention. Referring now to these three figures, the invention shall be further described. Moving elements of the picking units such as the gathering chains 32 and the stripper plates 33 can be seen in FIGURE 3. As can be best seen in FIGURE 4, a beater 36 is rotatably mounted on the corn head and extends transversely from one outer divider 16 to the other 17. The beater comprises a shaft having a plurality of radially extending flippers mounted thereon extending continuously from one outer divider to the other. The beater 36 overlies the sloped portions 26, 27, 28, 29 and 30 and functions to positively engage the material sliding down the sloped portions and move it into the trough 34 located rearwardly of the beater. As can be best seen in FIGURE 4 the sloped portions descend at a gentle angle to the horizontal and the beater 36 assists the material in its path to the trough 34. It has been found that the angle of the sloped portion is critical and that too steep of an angle greatly restricts the amount of trash that can fall into the trough and if the angle is too shallow the material will not slide down the slope. A slope arranged at approximately 20° to the horizontal has been found to be optimum and slopes within the range at 15° to 25° have been found to be satisfactory. The shallow angle permits loosely packed material to collect on the slope where it is fed to the trough 34 of the beater 36 through a process of attrition. The trough 34 contains material handling means such as a transverse auger 35 which functions to gather the material in the center of the trough and direct it toward the processing units of the combine. It has been found desirable to use means such as the beater 36 to positively feed the material into the troughs 34 containing the transverse auger 35 and the slope arranged at an angle within a range of 15° to 25° has been found to be an effective means of feeding material to the beater. An overhanging guide 37 extends transversely and shields the top portion of the beater 36 to insure that the beater engages the material when it is moving in a downward and rearward direction.

The various elements of the picking units, the transverse auger and the beater are all driven by conventional means from the combine and since these drives are not a part of the invention it has not been shown in detail. Reference may be had to the above referred to Karlsson et al. Patent No. 3,101,579 for a detailed disclosure of the driving mechanisms for these elements.

In operation the dividers 16, 17, 18, 19 and 20 direct the cornstalks into the center of the picking units 12, 13, 14 and 15. The gathering chains 32 then engage the stalks to direct them between the stripper plates 33 where they are pulled downwardly by the stripper rolls (not shown) until the ears engage the stripper plates. The stripper plates 33 hold the ears as the stripper roll pulls the stalk downwardly thus stripping the ear from the stalk. The loose ear is then moved up the stripper plates 33 by the gathering chains 32 until they reach the rotary beater 36 that throws the ears rearwardly into the trough 34 containing the transverse auger 35. The transverse auger 35 then functions to collect the ears at the center of the corn head and direct them rearwardly into the processing units of the combine. The above description is of the ideal situation in which only the ear of corn is received in the transverse trough 35. However, in actuality many downed and broken stalks are encountered, some stalks are broken during the snapping process and weeds and vines are harvested along with the corn. This invention helps overcome some of the difficulties created by these conditions. When broken stalks fall upon center dividers 18, 19 and 20 they will tend to collect and balance upon ridges 22, 23 and 24. These broken stalks are transported up the ridges by the other material and by the forward motion of the combine until they reach the brake 25. They then slide down the slopes 27, 28 and 29 where they are engaged by the beater 36 which by a process of attrition moves them into the trough 34. The stalks are then processed through the combine and deposited as waste.

It has been found that stringy material such as leaves and vines tend to wrap around the end of the beater shaft. This often accumulates to a point where the shaft can no longer be rotated and the combine must be stopped and the entangled vines removed before operation can be continued. This trouble has been alleviated by the use of corner filler pieces 39 that tend to turn the direction of material flow inwardly in the area around the ends of the beater. This not only causes the material that engages the corner filler pieces to avoid entanglement but also carries with it material inwardly of the corner filler pieces and initiate its inward movement.

It should be understood of course that the foregoing disclosure relates to only a preferred embodiment of the invention and that numerous modifications or alterations may be made therein without departing from the spirit or scope of the invention as set forth in the appended claims.

What is claimed is:

1. In a corn harvesting machine having a transverse frame, a pair of outer divider elements connected to said transverse frame at least one intermediately disposed center divider connected to said transverse frame; said outer divider elements having gathering sheets that are adapted to guide the material upwardly and inwardly; said intermediately disposed center divider having gathering sheets forming a ridge about a longitudinal center of said center divider and being adapted to guide material from either side of said ridge upwardly and outwardly; said outer and center dividers having downward and rearwardly directed sloped portions; a beater mounted on said harvesting machine extending from one outer divider to the other and overlying said downward and rearwardly sloped portions of the outer and center dividers, said beater comprising a shaft having a plurality of radially extending flippers mounted thereon extending continuously from one outer divider to the other; a transverse trough connected to said transverse frame adjacent and rearwardly of said beater and adapted to receive material directed to it by said gathering sheets, sloped portions and beater; material handling means in said trough for collecting the material and directing it to the harvesting machine.

2. The invention as set forth in claim 1 wherein said outer dividers are provided with corner filler pieces that protrude upwardly from the gathering sheets and converge inwardly and toward the rear, said corner filler pieces terminating adjacent the ends of said beater and function to direct the material in this area inwardly past the ends to prevent entanglement with the ends of said beater.

3. The invention as set forth in claim 1 wherein the sloped portions of said dividers during operation lie at an angle to the horizontal within a range of 15° to 25°.

4. The invention as set forth in claim 1 wherein said outer dividers are provided with corner filler pieces that protrude upwardly from the gathering sheets and converge inwardly and toward the rear, said corner filler pieces terminating adjacent the ends of said beater and function to direct the material in this area inwardly to prevent entanglement with the ends of said beater and wherein the said sloped portions of said dividers during operation lie at an angle to the horizontal within the range of 15° to 25°.

5. The invention as set forth in claim 1 wherein the sloped portions of said dividers during operation lie in an angle to the horizontal of approximately 20°.

References Cited by the Examiner

UNITED STATES PATENTS

| 2,737,767 | 3/1956 | Korsmo et al. | 56—18 |
| 2,946,170 | 7/1960 | Anderson | 56—18 |
| 3,174,266 | 3/1965 | Hoeksema | 56—18 |

ABRAHAM G. STONE, *Primary Examiner.*

ANTONIO F. GUIDA, *Examiner.*